(12) United States Patent
Renforth

(10) Patent No.: US 6,312,029 B1
(45) Date of Patent: Nov. 6, 2001

(54) LITTER SCOOP

(75) Inventor: Jack Renforth, Aurora, CO (US)

(73) Assignee: Aspen Pet Products, Inc., Denver, CO (US)

(*) Notice: Subject to any disclaimer, the term of this patent is extended or adjusted under 35 U.S.C. 154(b) by 0 days.

(21) Appl. No.: 09/307,927

(22) Filed: May 10, 1999

(51) Int. Cl.$^7$ .............................. A01K 29/00; B07B 1/02
(52) U.S. Cl. .............................. 294/1.3; 294/55; 209/418
(58) Field of Search .................... 294/1.3–1.5, 9, 294/49, 55, 55.5; 209/417–419; D30/162; 15/257.1, 257.3

(56) References Cited

U.S. PATENT DOCUMENTS

| | | | |
|---|---|---|---|
| 226,351 | * | 4/1880 | Reddick ............................. 209/419 |
| D. 256,173 | | 7/1980 | Rigney ............................. D30/99 |
| D. 332,675 | * | 1/1993 | Simon ............................. 294/1.3 |
| 892,892 | * | 7/1908 | Robisch ............................. 209/419 |
| 1,141,423 | * | 6/1915 | Simas ............................. 209/419 |
| 3,879,079 | * | 4/1975 | Nicholas ............................. 294/1.4 |
| 5,246,260 | * | 9/1993 | Racicot ............................. 294/55 |
| 5,711,564 | * | 1/1998 | Campbell ............................. 294/1.3 |
| 5,921,596 | * | 7/1999 | Sheriff et al. ............................. 209/418 |
| 6,095,340 | * | 8/2000 | Dedrick ............................. 209/417 |

* cited by examiner

Primary Examiner—Dean J. Kramer
(74) Attorney, Agent, or Firm—Wolf, Greenfield & Sacks, P.C.

(57) ABSTRACT

According to one aspect, a litter scoop is provided that permits a user to take multiple passes with the scoop through litter having animal waste therein, without having to empty the litter scoop after each pass. In one embodiment, a rake portion and a receptacle portion of the litter scoop are separated by a lip arranged to retain the clumps of animal waste in the receptacle portion during reuse of the litter scoop. In another embodiment, a top edge of a receptacle of the litter scoop is located generally in a plane, and at least a portion of an inner surface of the receptacle that faces a proximal end of the receptacle is arranged such that a line normal to the portion of the inner surface of the receptacle is oriented at an acute angle with respect to the plane that is less than forty-five degrees.

14 Claims, 3 Drawing Sheets

LITTER SCOOP

BACKGROUND OF THE INVENTION

1. Field of the Invention

The present invention is directed to pet supplies and, more particularly, to implements for cleaning animal waste from litter.

2. Description of Related Art

When animals such as cats are kept indoors for long periods of time, it is necessary to provide a place for them to leave waste (i.e., urinate or defecate), lest they may do so on the floor or the furniture within the residence. For this reason, many people train their pets to leave their waste in a box full of litter (i.e., a litter box). To keep litter boxes from emanating an unpleasant odor, it is necessary either to remove the animal waste from the used litter, or to discard the used litter having the animal waste therein and replace it with a new batch of litter. Many pets are even reluctant to use a litter box that is not cleaned regularly. Because it could become quite expensive to replace litter each time a pet uses a litter box, most people choose to use a so-called "litter scoop" to selectively separate the animal waste from the litter, thereby leaving the litter fresh and ready for another use by the pet.

A typical prior art litter scoop includes a receptacle adapted to receive a quantity of litter and a handle attached to the receptacle that may be grasped by a user to insert the receptacle into the litter underneath the animal waste. Generally, the receptacle in such a prior art device includes a screen that permits the litter to exit the receptacle yet retains the animal waste therein.

SUMMARY OF THE INVENTION

Because animal waste is typically strewn throughout the litter in a litter box, it is generally necessary for the user of a litter scoop to take multiple passes with the scoop through the litter in order to remove all of the animal waste therefrom. In using a prior art litter scoop such as that described above, the user must empty the waste from the receptacle after each pass through the litter. Otherwise, the waste left in the receptacle may fall out of the receptacle each time the user tilts the receptacle to pass through another section of the litter. This inability of a litter scoop to retain animal waste in its receptacle portion during multiple passes through the litter increases the time required for a pet owner to clean a litter box.

According to one aspect of the invention, a litter scoop is provided that permits a user to take multiple passes with the scoop through used litter, without having to empty animal waste from the litter scoop after each pass.

In one embodiment, a litter scoop includes a rake portion, a receptacle portion, and a handle. The receptacle portion has openings therein that are large enough to enable litter to exit the receptacle yet are small enough to retain clumps of animal waste in the receptacle. The handle is attached to the receptacle portion to permit a user grasp the handle and insert the litter scoop into litter. The rake portion and the receptacle portion are separated by a lip arranged to retain the clumps of animal waste in the receptacle portion during reuse of the litter scoop.

In another embodiment, a litter scoop includes a receptacle and a handle. The handle is attached to a proximal end of the receptacle to permit a user grasp the handle and insert a distal end of the receptacle into litter. The receptacle has openings therein that are large enough to enable litter to exit the receptacle yet are small enough to retain clumps of animal waste in the receptacle. A top edge of the receptacle is located generally in a plane, and at least a portion of an inner surface of the receptacle that faces the proximal end of the receptacle is arranged such that a line normal to the portion of the inner surface of the receptacle is oriented at an acute angle with respect to the plane that is less than forty-five degrees.

DETAILED DESCRIPTION OF THE INVENTION

Figure 1:
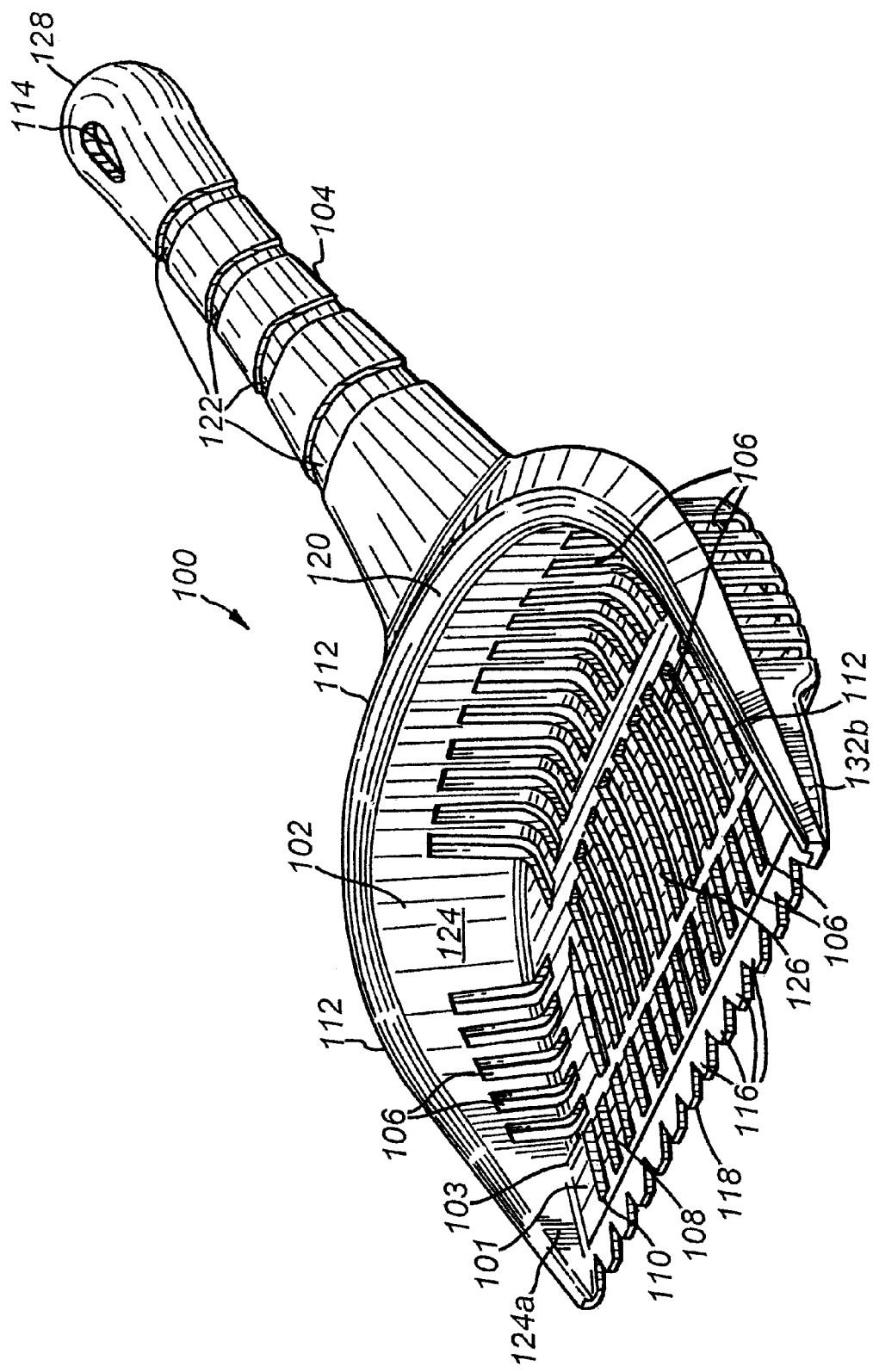
FIG. 1 is a perspective view of a litter scoop according to one embodiment of the invention.
Figure 2:
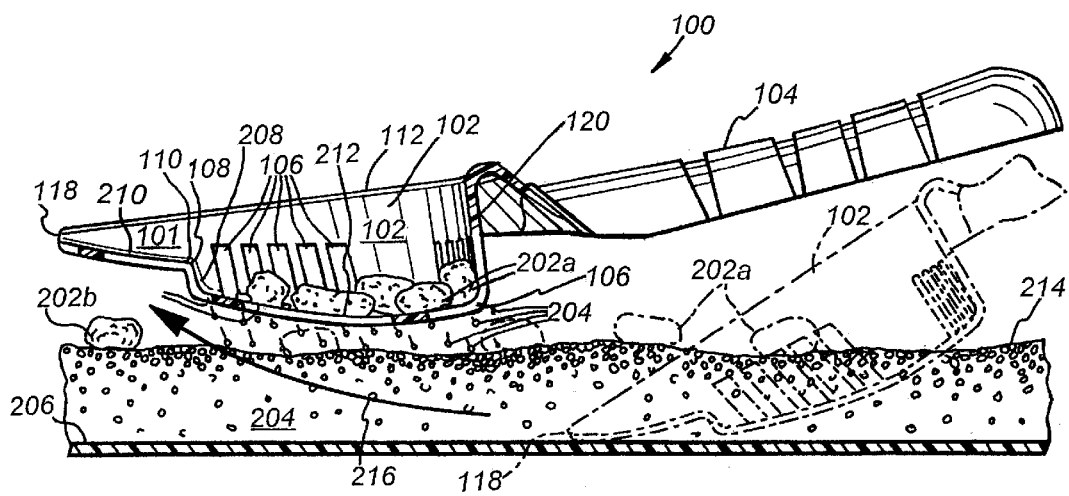
FIG. 2 is a partial-cutaway, side-view of the litter scoop of FIG. 1 shown as it may appear after a user has taken a first scoop of animal waste and litter from a litter box.

FIGS. 1–4 show a litter scoop 100 according to one illustrative embodiment of the present invention. As shown, the litter scoop 100 includes a rake portion 101, a receptacle portion 102, and a handle 104. The rake portion 101 is connected to a distal end 103 of the receptacle portion 102, and the handle 104 is connected to a proximal end 120 of the receptacle portion 102. This position of the handle 104 permits a user to grasp the handle 104 to insert a distal end 118 of the litter scoop 100 into litter 204 disposed in a litter box 206 (FIG. 2).

As shown, the receptacle portion 102 may include a plurality of openings 106 which are large enough to permit litter 204 to exit the receptacle portion 102 yet are small enough to retain clumps of animal waste therein. In the illustrative embodiment shown, the rake portion 101 also includes openings 106 therein so that litter may also exit the litter scoop 100 from the rake portion 101. It should be appreciated, however, that the invention is not limited in this respect, and that the rake portion 101 need not include any openings 106 therein.

In the embodiment shown, the rake portion 101 and the receptacle portion 102 are separated from one another by a lip 108. As can be seen best in FIGS. 2 and 3, a surface 208 of the lip 108 extends downwardly from a ledge 110 of the rake portion 101. As is explained in more detail below, the presence of the lip 108 prevents animal waste 202a in the receptacle portion 102 from exiting the receptacle portion 102 and falling from the distal end 118 of the litter scoop 100 when the litter scoop 100 is tilted to re-insert the distal end 118 into the litter 204. As is also explained in more detail below, the presence of the ledge 110 permits animal waste 202a present on an upper surface 210 of the rake portion 101 to fall into the receptacle portion 102 when the user brings an upper surface 112 of the receptacle portion 102 to a substantially level position (e.g., as shown in FIG. 2).

The rake portion 101 may be configured in any of numerous ways, and the invention is not limited to any particular configuration. In the illustrative embodiment shown, for example, the rake portion 101 includes fingers 116 extending therefrom. The fingers 116 may be used, for example, to sift through the litter 204 for the clumps of animal waste 202 or to groom an upper surface 214 of the litter 204 after removing the clumps of animal waste 202 therefrom. It should be appreciated, however, that the invention is not limited in this respect, and that the rake portion 101 need not include the fingers 116.

The receptacle portion 102 may also be configured in any of a number of ways, and the invention is not limited to any particular configuration. In the illustrative embodiment shown, for example, the receptacle portion 102 includes a substantially U-shaped sidewall 124 and a bottom portion 126. In the embodiment shown, a portion 124a of the sidewall 124 also extends above the rake portion 101 to cause animal waste 202a received by the rake portion 101 to be directed toward the receptacle portion 102 when the user brings the upper surface 112 of the receptacle portion 102 to a substantially level position (e.g., as shown in FIG. 2). In one embodiment, the maximum height of the sidewall 124 with respect to an upper surface 212 (FIG. 2) of the bottom portion 126 is approximately 3.60 centimeters (cm), and the maximum height of the sidewall portion 124a with respect to an upper surface 210 (FIG. 2) of the rake portion 101 is approximately 1.52 cm. In another (slightly larger) embodiment, the maximum height of the sidewall 124 with respect to the upper surface 212 of the bottom portion 126 is approximately 4.24 cm, and the maximum height of the sidewall portion 124a with respect to the upper surface 210 of the rake portion 101 is approximately 1.74 cm.

The handle 104 may be configured in many of numerous ways, and the invention is not limited to any particular type of handle. In the illustrative embodiment shown in the figures, for example, the handle 104 includes a plurality of grooves 122 extending circumferentially around the handle 104. The grooves 122 inhibit the handle 104 from slipping from the user's grasp. In addition, in the embodiment shown, the handle 104 includes an opening 114 in a proximal end 128 of the handle 104 which permits the litter scoop 100 to be hung from a hook, nail, screw, or the like, to store the litter scoop 100 when it is not being used.

In the illustrative embodiment shown, the rake portion 101, the receptacle portion 102, and the handle 104 all are integrally formed of a plastic material. It should be appreciated, however, that the various components of the litter scoop 100 may be made of any of a number of alternative materials (e.g., aluminum, steel, fiber glass, etc.) and may be connected together in any of numerous ways; the invention is not limited to the plastic-molded example shown in the figures. Additionally, it should be appreciated that, in alternative embodiments, each of the various components may be made of a different material than the other components.

Figure 4:
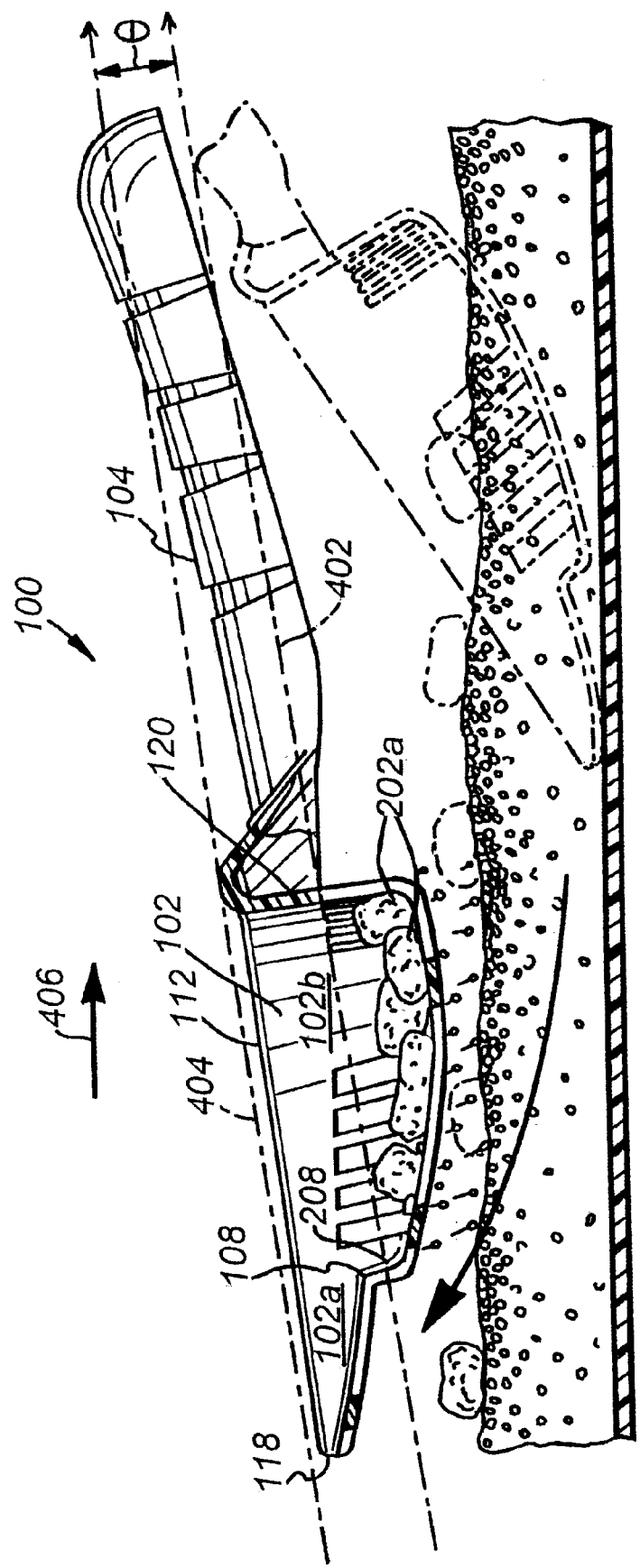
FIG. 4 is a partial-cutaway, side-view of the litter scoop of FIG. 1 shown as it may appear when the user has taken a scoop of animal waste from a litter box and also showing the orientation of an upper surface of the litter scoop receptacle with respect to a waste retention lip thereof.

As is illustrated in FIG. 4, according to one embodiment of the invention, the surface 208 of the lip 108 faces generally toward the proximal end 120 of the receptacle portion 102 in the direction indicated by the arrow 406. A dashed line 402 in FIG. 4 represents a line which is normal to a portion of the surface 208 (and which remains stationary with respect to the litter scoop 100), and a dashed line 404 represents a cross-section of a plane (which remains stationary with respect to the litter scoop 100) in which the upper edge 112 of the receptacle portion 102 is generally oriented.

As shown in FIG. 4, according to one embodiment of the invention, the line 402 is oriented at an acute angle θ with respect to the line 404. In the FIG. 4 example, the line 402 intercepts the line 404 at a location (not shown) to the right of the figure. It should be appreciated, however, that portion of the portion of the surface 208 to which the line 402 is normal could also be oriented such that the line 402 intercepts the line 404 at a location (not shown) to the left of the figure. In either case, the angle θ can be made small enough so that the clumps of animal waste 202a present in the receptacle portion 102 are retained in the receptacle portion 102 by the surface 208 of the lip 108. Preferably, the angle θ is less than 45°, more preferably, the angle θ is less than 30°, and still more preferably, the angle θ is less than 15°. In this regard, it should be appreciated that the angle θ may also be any other angle less than, greater than, or in between these preceding example angles, so long as the surface 208 is oriented so as to retain the clumps of animal waste 202a in the receptacle portion 102 when the user tilts the litter scoop 100 (as explained below) to re-insert the distal end 118 of the litter scoop 100 into the litter to receive another quantity of litter 204 containing animal waste 202. It should also be appreciated that the size of the portion of the surface 208 which faces generally in the direction 406 towards the proximal end 120 and to which the line 402 is normal may be quite small. It is important only that some portion of the surface of the lip 108 (or another surface) faces generally in the direction 406 so that the clumps of animal waste 202a are retained in the receptacle portion 202 when the litter scoop 100 is reused.

Figure 3:
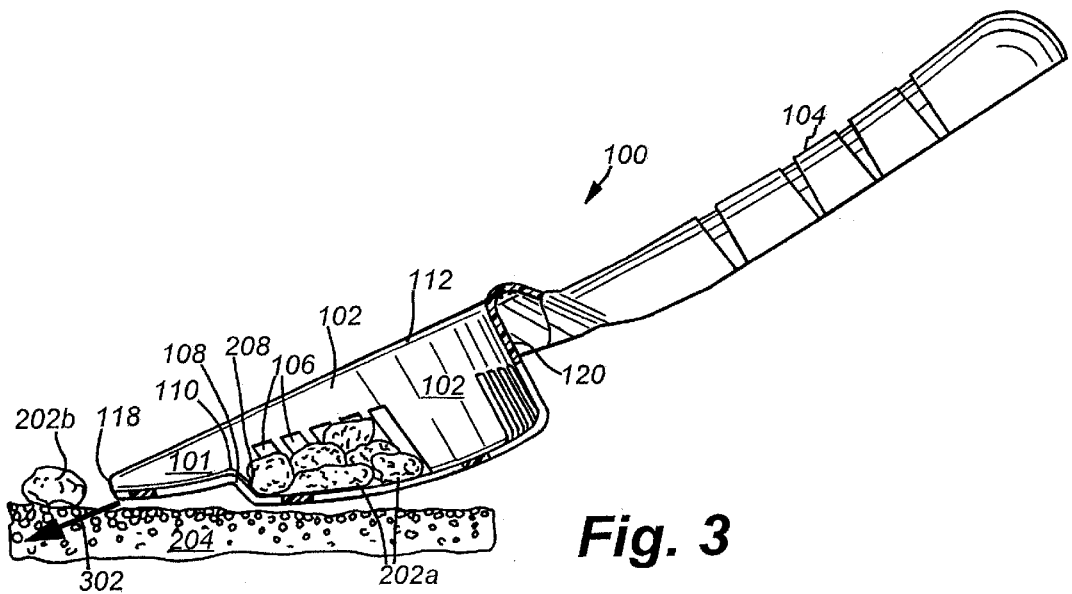
FIG. 3 is a partial-cutaway, side-view of the litter scoop of FIG. 1 shown as it may appear when a user is taking a second scoop of animal waste and litter, after having previously taken a first scoop thereof.

Operation of the litter scoop 100 is illustrated in FIGS. 2 and 3. As shown in phantom in FIG. 2, the handle 104 may first be tilted to an angle of approximately 45° with respect to an upper surface 214 of the litter 204, and the distal end 118 of the litter scoop 100 may be inserted into the litter 204 in the litter box 206 wherein clumps of animal waste 202a are disposed.

As indicated by the arrow 216 (FIG. 2), the handle 104 may then be manipulated such that the distal end 118 is caused to pass through the litter 204 so that the receptacle portion 102 receives a quantity of litter 204 as well as some pieces of animal waste 202a.

As indicated in solid lines in FIG. 2, the handle 104 may then be tilted such that it is substantially level. When the litter scoop 100 is held in this position, the openings 106 in the receptacle portion 102 permit the litter 204 to exit the receptacle portion 102, but retain the pieces of animal waste 202a in the receptacle portion 102. When the receptacle portion 102 is oriented as shown in FIG. 2, i.e., so that the upper edge 112 of the receptacle portion 102 is generally level, the upper surface 210 of the rake portion 101 is higher than the upper surface 212 of the receptacle portion 102. Therefore, any clumps of animal waste 202a that find themselves atop the upper surface 210, will be forced by gravity to fall over the ledge 110 defined by the lip 108 into the receptacle portion 102. In the embodiment shown, the presence of the openings 106 in the rake portion 101 facilitate this action of the waste 202a by filtering the litter 204 from the rake portion 101, thereby permitting the clumps of waste 202 to fall into the receptacle portion 102.

As illustrated in FIG. 3, after the user has taken a first scoop of litter 204 from the litter box 206 so that the clumps of animal waste 202a remain in the receptacle portion 102, the user may reuse the litter scoop 100 a second time by again tilting the handle 104 to an angle of approximately 45° with respect to the upper surface 214 of the litter 204, and inserting the distal end 118 of the litter scoop 100 into the litter 204 (as indicated by arrow 302) underneath one or more additional clumps of animal waste 202b. As shown in FIG. 3, when the user tilts the handle 104 to take a second pass with the litter scoop 100 through the litter 204, the animal waste 202a already in the receptacle portion 102 is held therein by the surface 208 of the lip 108.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A litter scoop, comprising:

a rake portion, a receptacle portion, and a handle;

the receptacle portion having openings in at least a bottom portion thereof that are large enough to enable litter to exit the receptacle portion yet are small enough to retain clumps of domestic cat waste in the receptacle portion, the bottom portion of the receptacle portion being located generally in a first plane, the receptacle portion further comprising a substantially U-shaped side wall extending along a portion of a perimeter of the bottom portion of the receptacle portion, a middle section of the substantially U-shaped side wall being located generally in a second plane which is transverse to the first plane;

the rake portion comprising a plurality of fingers extending from a distal end thereof, the rake portion further comprising a bottom portion located generally in a third plane which is spaced apart from and substantially parallel to the first plane;

the handle having an elongated shape and being attached to the receptacle portion to permit a user grasp the handle and insert the litter scoop into litter, the handle extending generally in a first direction away from the receptacle portion and the rake portion, the first direction being substantially parallel to each of the first and third planes; and the rake portion and the receptacle portion being separated by a lip arranged to retain the clumps of domestic cat waste in the receptacle portion during reuse of the litter scoop.

2. The litter scoop of claim 1, wherein the lip defines a ledge between the rake portion and the receptacle portion so that domestic cat waste present in the rake portion can fall into the receptacle portion when a top edge of the receptacle portion is substantially level.

3. The litter scoop of claim 2, wherein:

the top edge is located generally in a fourth plane; and at least a portion of a surface of the lip is arranged such that a line normal to the portion of the surface of the lip is oriented at an acute angle with respect to the fourth plane that is less than forty-five degrees.

4. The litter scoop of claim 3, wherein the portion of the surface of the lip is arranged such that the line is oriented at an acute angle with respect to the fourth plane that is less than thirty degrees.

5. The litter scoop of claim 4, wherein the portion of the surface of the lip is arranged such that the line is oriented at an acute angle with respect to the fourth plane that is less than fifteen degrees.

6. The litter scoop of claim 2, wherein the bottom portion of the rake portion has openings therein that are large enough to enable litter to pass therethrough yet are small enough to prevent clumps of domestic cat waste from passing therethrough.

7. The litter scoop of claim 1, wherein:

the receptacle portion includes a top edge located generally in a fourth plane; and at least a portion of a surface of the lip is arranged such that a line normal to the portion of the surface of the lip is oriented at an acute angle with respect to the plane that is less than forty-five degrees.

8. The litter scoop of claim 7, wherein the portion of the surface of the lip is arranged such that the line is oriented at an acute angle with respect to the fourth plane that is less than thirty degrees.

9. The litter scoop of claim 8, wherein the portion of the surface of the lip is arranged such that the line is oriented at an acute angle with respect to the fourth plane that is less than fifteen degrees.

10. The litter scoop of claim 1, wherein the bottom portion of the rake portion has openings therein that are large enough to enable litter to pass therethrough yet are small enough to prevent clumps of domestic cat waste from passing therethrough.

11. The litter scoop of claim 1, wherein the receptacle portion is configured such that the second plane is substantially perpendicular to the first plane.

12. The litter scoop of claim 11, wherein the handle is attached to the receptacle portion such that the first direction is substantially normal to the second plane.

13. The litter scoop of claim 1, wherein the handle is attached to the receptacle portion such that the first direction is substantially normal to the second plane.

14. The litter scoop of claim 1, wherein at least a portion of the substantially U-shaped side wall is curved along its length.

* * * * *